US011250042B2

(12) United States Patent
Chang et al.

(10) Patent No.: US 11,250,042 B2
(45) Date of Patent: Feb. 15, 2022

(54) TAXONOMY ENRICHMENT USING ENSEMBLE CLASSIFIERS

(71) Applicant: Microsoft Technology Licensing, LLC, Redmond, WA (US)

(72) Inventors: Keng-hao Chang, San Jose, CA (US); Srinivasa Reddy Neerudu, Redmond, WA (US); Sujith Vishwajith, Cupertino, CA (US); Ruofei Zhang, Mountain View, CA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 260 days.

(21) Appl. No.: 16/001,495

(22) Filed: Jun. 6, 2018

(65) Prior Publication Data

US 2019/0377825 A1  Dec. 12, 2019

(51) Int. Cl.
*G06F 16/35* (2019.01)
*G06F 16/31* (2019.01)
*G06K 9/62* (2006.01)
*G06F 40/30* (2020.01)
*G06F 40/247* (2020.01)

(52) U.S. Cl.
CPC ............ *G06F 16/35* (2019.01); *G06F 16/313* (2019.01); *G06F 40/247* (2020.01); *G06F 40/30* (2020.01); *G06K 9/6267* (2013.01)

(58) Field of Classification Search
CPC ...... G06F 16/35; G06F 16/313; G06F 40/247; G06F 40/30; G06K 9/6267
USPC ................................................ 707/737, 707
See application file for complete search history.

(56) References Cited

U.S. PATENT DOCUMENTS

| 9,665,628 | B1* | 5/2017 | Dubey | G06F 16/24575 |
| 2006/0242180 | A1* | 10/2006 | Graf | G06F 16/86 |
| 2011/0264598 | A1* | 10/2011 | Fuxman | G06Q 30/0281 705/343 |
| 2011/0276581 | A1* | 11/2011 | Zelevinsky | G06F 16/3323 707/766 |
| 2012/0109966 | A1* | 5/2012 | Liang | G06F 16/338 707/740 |
| 2012/0233188 | A1* | 9/2012 | Majumdar | G06F 16/367 707/756 |
| 2012/0239488 | A1* | 9/2012 | Zimmerman | G06Q 30/02 705/14.41 |
| 2013/0311475 | A1* | 11/2013 | Emanuel | G06N 20/00 707/740 |
| 2014/0114982 | A1 | 4/2014 | Lamba et al. | |

(Continued)

OTHER PUBLICATIONS

"International Search Report and Written Opinion Issued in PCT Application No. PCT/US2019/034478", dated Aug. 9, 2019, 13 Pages.

(Continued)

*Primary Examiner* — Hosain T Alam
*Assistant Examiner* — Nicholas E Allen

(57) ABSTRACT

A taxonomy of categories, attributes, and values can be conflated with new data triplets by identifying one or more conflation candidates among the attribute-value pairs within a category of the taxonomy that matches the category of the data triplet, and determining a suitable merge action for conflating the data triplet with each conflation candidate. The task of determining merge actions may be cast as a classification problem, and may be solved by an ensemble classifier.

20 Claims, 6 Drawing Sheets

(56) References Cited

U.S. PATENT DOCUMENTS

| | | | |
|---|---|---|---|
| 2014/0181146 A1* | 6/2014 | Jamthe | G06Q 50/01 707/777 |
| 2014/0372441 A1 | 12/2014 | Kanungo et al. | |
| 2015/0339604 A1* | 11/2015 | Alikhan | G06Q 10/0635 705/7.28 |
| 2016/0063590 A1* | 3/2016 | Subramanya | G06F 16/367 705/26.61 |
| 2016/0179945 A1* | 6/2016 | Lastra Diaz | G06F 16/3334 707/739 |
| 2017/0103434 A1* | 4/2017 | Hurwitz | G06Q 30/0601 |
| 2017/0177703 A1* | 6/2017 | Liu | G06F 16/2237 |
| 2017/0293842 A1* | 10/2017 | Buchanan | G06F 16/353 |
| 2018/0060306 A1* | 3/2018 | Starostin | G06F 40/211 |
| 2018/0121500 A1* | 5/2018 | Reschke | G06F 40/30 |
| 2018/0137191 A1* | 5/2018 | Yan | G06F 16/9535 |

OTHER PUBLICATIONS

Baeza-Yates, et al., "Extracting Semantic Relations from Query Logs", In Proceedings of the 13th ACM SIGKDD international conference on Knowledge discovery and data mining, Aug. 12, 2007, pp. 76-85.

Bojanowski, et al., "Enriching Word Vectors with Subword Information", In Journal of Computing Research Repository, Jul. 2016, 12 Pages.

Greff, et al., "LSTM: A Search Space Odyssey", In Journal of Computing Research Repository, Mar. 2015, 18 Pages.

Hochreiter, et al., "Long Short-Term Memory", In Journal of Neural Computation, vol. 9, Issue 8, Nov. 15, 1997, pp. 1735-1780.

Li, et al., "Extracting Structured Information from User Queries with Semi-Supervised Conditional Random Fields", In Proceedings of the 32nd International ACM SIGIR Conference on Research and Development in Information Retrieval, Jul. 19, 2009, 8 Pages.

Melnik, et al., "Similarity flooding: A versatile graph matching algorithm and its application to schema matching", In Proceedings of 18th International Conference on Data Engineering, Feb. 26, 2002, pp. 1-12.

Mikolov, et al., "Efficient Estimation of Word Representations in Vector Space", In Journal of Computing Research Repository, Jan. 2013, pp. 1-12.

Mikolov,, et al., "Distributed Representations of Words and Phrases and their Compositionality", In Journal of Computing Research Repository, Oct. 2013, pp. 1-9.

Miller, et al., "Introduction to WordNet: An on-line lexical database", In International Journal of lexicography, vol. 3, Issue 4, Dec. 1990, pp. 1-86.

Mueller, et al., "Siamese Recurrent Architectures for Learning Sentence Similarity", In Proceedings of the Thirtieth AAAI Conference on Artificial Intelligence, Feb. 12, 2016, pp. 2786-2792.

Neshati, et al., "Taxonomy Learning Using Compound Similarity Measure", In Proceedings of the IEEE/WIC/ACM International Conference on Web Intelligence, Nov. 2, 2007, pp. 487-490.

Nguyen, "Distinguishing Antonyms and Synonyms in a Pattern-based Neural Network", In Journal of Computing Research Repository, Jan. 2017, 10 Pages.

Zaremba, et al., "Recurrent neural network regularization", In Journal of Computing Research Repository, Sep. 2014, 8 Pages.

Ponzetto, et al., "Knowledge-rich word sense disambiguation rivaling supervised systems", In Proceedings of the 48th annual meeting of the association for computational linguistics, Jul. 11, 2010, pp. 1522-1531.

Rokach, Lior, "Ensemble-based classifiers", In Journal of Artificial Intelligence Review, vol. 33, Issue 1-2, Feb. 2010, pp. 1-39.

Tai, et al., "Improved semantic representations from tree-structured long short-term memory networks", In Journal of Computing Research Repository, Mar. 2015, 11 Pages.

Velardi, et al., "OntoLearn Reloaded: A Graph-Based Algorithm for Taxonomy Induction", In Journal of Computational Linguistics, vol. 39, Issue 3, Sep. 2013, pp. 665-707.

Oram, P., "WordNet: An electronic lexical database. Christiane Fellbaum (Ed.). Cambridge, MA: MIT Press, 1998. pp. 423", 2001, Applied Psycholinguistics 22:1 Book Reviews, pp. 131-134.

* cited by examiner

TAXONOMY ENRICHMENT USING ENSEMBLE CLASSIFIERS

TECHNICAL FIELD

The disclosed subject matter relates generally to taxonomies representing categories and associated attributes, and more specifically to systems and methods for taxonomy enrichment with additional data.

BACKGROUND

Many information retrieval systems, such as, for instance, search and recommendation systems, utilize taxonomies of categories of items or entities and their attributes. An online nature guide, for instance, may represent plants and animals in a hierarchy of categories and subcategories corresponding to domain, kingdom, phylum, class, order, family, genus, and species, and characterize each (sub-)category within the hierarchy with relevant attributes and their possible values. For example, for animals, one attribute may specify the number of legs (which generally takes, at the species level, only one value), and for flowering plants, one attribute may specify the flower color, which may take multiple values in some cases. When a user searches for a "yellow flower with toothy leaves," the taxonomy may be used to ascertain that the plant the user is trying to identify is likely a dandelion. Similarly, when a gardener uses a plant-selection tool to search for "shade perennials hardiness zone 8," the taxonomy may be searched for plants that meet the specified attributes. As will be apparent from these examples, the value and usefulness of a taxonomy is generally a function of its comprehensiveness and richness. Identifying and understanding more attributes can serve to increase the relevance of search results and/or diversify search results by suggesting items with alternative attribute values. With increased attribute knowledge, search tools can also offer users more options to narrow down their queries.

While it is relatively straightforward, for many types of taxonomies, to obtain relevant attribute data, e.g., by mining the internet, building a comprehensive taxonomy often involves assembling data from multiple sources. The task of automatically conflating data from multiple sources into one rich taxonomy, e.g., by inserting new data into an existing taxonomy, does not, however, admit of an easy solution. The decision where and how to insert the new data may be particularly challenging for taxonomies with a complex structure (e.g., where different categories contain different sets of attributes, values, synonyms, and even sub-categories) and when dealing with synonyms (i.e., structurally different text entities that refer to the same concept, such as, e.g., "purple" and "violet") and homographs (i.e., text entities of the same spelling that refer to varying concepts, such as, e.g., "teeth," which may refer to an animal's teeth or the shape of a leaf, depending on context). While there are software tools for automatically constructing a taxonomy from scratch based on data extracted from documents, effective approaches for expanding an existing taxonomy based on new data items are still needed.

SUMMARY

Described herein are systems, methods, and computer program products (as embodied in machine-readable media) for automatically expanding, and thereby enriching, a taxonomy of categories, attributes, values, and (optionally) value synonyms with additional data. In accordance with various embodiments, data in the form of, e.g., data triplets each including an attribute-value pair and an associated category are merged into an existing taxonomy in multiple steps. In a first step, a branch within the taxonomy that corresponds to a category matching the category of the data triplet is searched for one or more attribute-value pairs that are similar, in accordance with a suitable measure of similarity that may combine syntactic and semantic features, to the attribute value pair of the data triplet; the one or more similar attribute-value pairs within the taxonomy are hereinafter referred to as "conflation candidates." In a next step, an ensemble classifier is used to select, for each of the one or more conflation candidates, one among several possible actions for merging the attribute-value pair of the data triplet with the respective conflation candidate. Based on similarity of values and attributes between the data triplet and the conflation candidate(s), the classification may, for example, decide whether the attribute-value pair of the data triplet is to be added to the taxonomy as a new attribute, added to an existing attribute as a new value, added to an existing attribute-value pair as a new value synonym, or ignored because it is a duplicate (or near-duplicate) of an existing attribute value pair. Among multiple conflation candidates, one of the candidates and the corresponding merge action may be chosen based on confidence scores associated with the classifications. The taxonomy may then be extended with the data triplet based on the classification, either automatically without further input, or upon manual validation of the selected conflation candidate and merge action by a user.

In various embodiments, the ensemble classifier includes two or more different classifier models that each classify the conflation candidates independently from the other classifier models, and whose individual classifications are then combined in some prescribed manner, e.g., by majority voting (in conjunction with rules that address situations where no majority exists). In some embodiments, the ensemble classifier includes a heuristic model, a decision tree model, and a neural network model (such as, e.g., a Siamese long short-term memory network model that takes sentence embeddings of the attribute-value pairs of the conflation candidate and the data triplet as input features). These classifier models generally include adjustable parameters that can be tuned by hand and/or machine-learned from training data. In various embodiments, training data is generated by sampling training data triplets from the existing taxonomy, (randomly) assigning classifications to the training data triplets, and redacting the existing taxonomy consistent with the assigned classification.

BRIEF DESCRIPTION OF THE DRAWINGS

The foregoing will be more readily understood from the following detailed description of various embodiments, in particular, when taken in conjunction with the accompanying drawings.

DETAILED DESCRIPTION

The present disclosure relates to the enrichment of taxonomies of entities and their attributes with additional data. In particular, the taxonomies contemplated herein each hierarchically organize information about the entities in terms of categories, attributes, and values (including, optionally, value synonyms). The disclosed systems and methods, and the underlying principles, are generally applicable to any set of entities amenable to organization into categories and characterization in terms of attributes; these sets of entities include, for example, people, organisms, products of nature (e.g., minerals), commercial products, institutions or organizations, countries, areas of research or study, diseases information media, and others. Commercial applications include, for instance, taxonomies of products (both tangible and intangible, the latter including, e.g., insurance and financial products), real property, and/or services, where richer taxonomies can improve the relevancy of search result listings or the targeting of advertisements or unsolicited recommendations.

Figure 1:
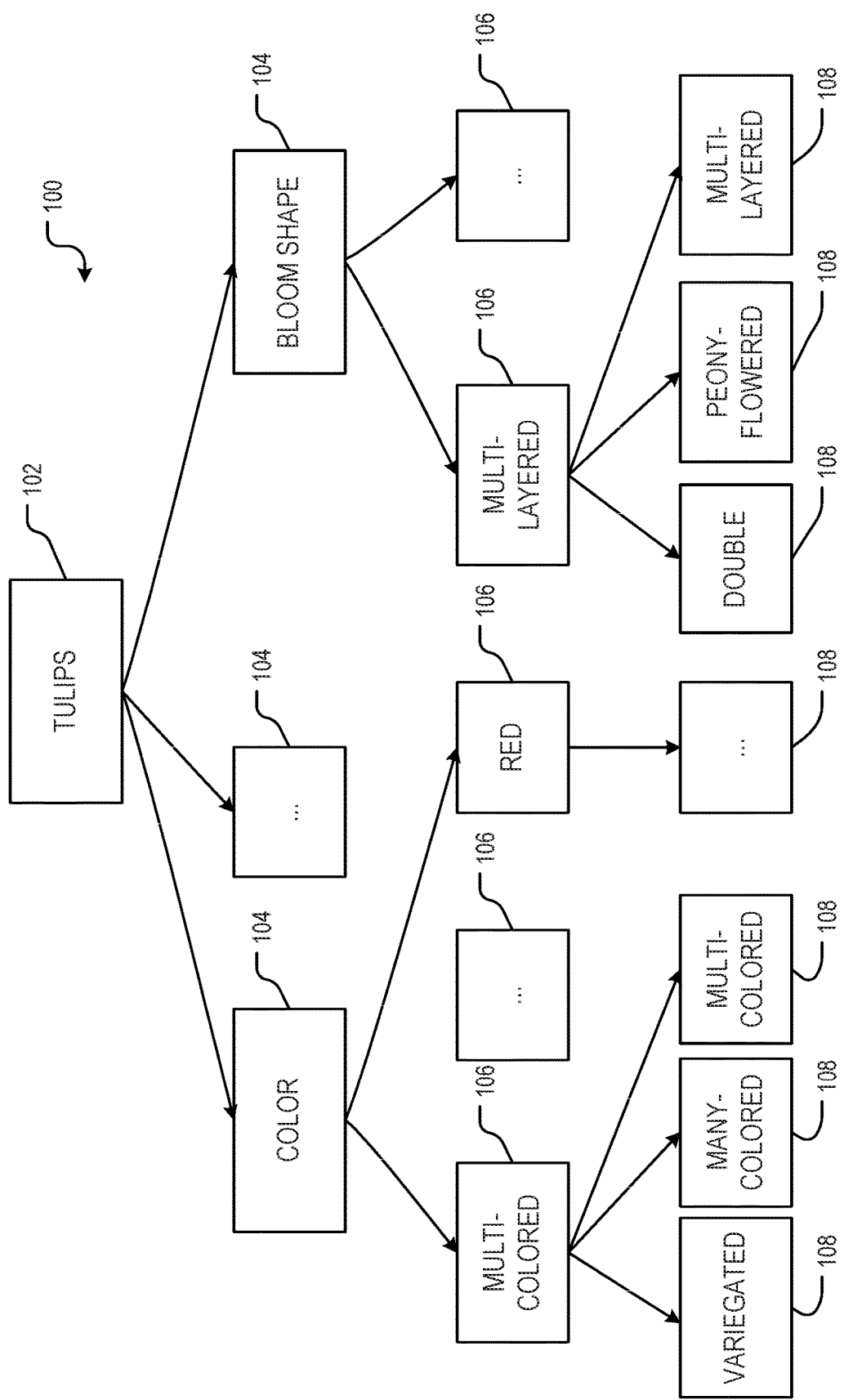
FIG. 1 is a diagram of a branch of an example taxonomy graph in accordance with various embodiments.

For purposes of illustration, FIG. 1 shows a branch, or subgraph 100, of a graph representing an example plant taxonomy in accordance with various embodiments. Plants can be organized into a multi-level hierarchy of categories and subcategories. In a botanical taxonomy, for instance, the various levels may correspond to divisions, classes, series, family, genus, and species. In a common-parlance hierarchy, trees, shrubs, and herbaceous plants may constitute different categories of plants, and within the category of trees, we can distinguish subcategories such as deciduous and coniferous trees. The subcategories can be further subdivided, e.g., to group deciduous trees into oaks, maples, beeches, etc. Plants within each of the categories or subcategories can be characterized by attributes, which generally vary between different categories in type and number.

The subgraph 100 illustrates a single (sub-)category 102 of plants within the plant taxonomy, namely "tulips." Considering this category 102 the first level of the subgraph 100, the category 102 is characterized, at the next (second) level of the hierarchy, by a number of attributes 104. In the depicted example, these attributes include the flower color and the bloom shape of of the tulip. The third level of the hierarchy specifies one or more possible values 106 for each attribute. The color can, for instance, be red or multi-colored (among others), and the bloom-shape may be multi-layered. Finally, the meaning of a value can often be expressed with multiple structurally different textual tokens, which constitute synonyms of each other. For example, "multi-colored" can also be called "many-colored" or "variegated", and a multi-layered bloom shape may also be referred to as "double" or "peony-flowered." Such value synonyms 108 may be specified at a fourth level of the hierarchy, and may serve, for instance, to supplement product search matching by identifying different possible representations of the same value. Note that a hierarchical taxonomy branch including attributes, values, and value synonyms, such as the subgraph 100 depicted in FIG. 1, can generally attach to any category or sub-category in a taxonomy.

To more formally describe the nodes within a taxonomy graph, let, for any category node c in the graph, $[c_1, c_2, \ldots, c_l]$ denote the list of sub-categories (i.e., child nodes) of c. Further, let $[a_1, a_2, \ldots, a_n]$ denote the list of attributes of the category c. For a given attribute $a_i$ (i=1 . . . n), let $[v_{i_1}, v_{i_2}, \ldots, v_{i_k}]$ (k differing between attributes) denote the list of possible values of that attribute. Finally, for a given attribute value $v_{i_j}$ (j=1 . . . k), let $$[S_{i_{j_1}}, S_{i_{j_2}}, \ldots, S_{i_{j_s}}]$$

(s differing between values) denote the list of synonyms of that value. Note that a value is considered a synonym of itself, that is, one of the $$S_{i_{j_r}}$$

(r=1 . . . s) is equal to $v_{i_j}$.

The task of conflating data from different sources into a single taxonomy can be cast, from the perspective of a given taxonomy, as merging data triplets (c, $a_m$, $v_m$) that each specify a category c and an associate pair of attribute $a_m$ and value $v_m$ into the taxonomy. More specifically, for each such data triplet, the attribute-value pair ($a_m$, $v_m$) is to be inserted into the subgraph for category c in the appropriate place and manner. In accordance with various embodiments, the options for aligning and conflating the pair ($a_m$, $v_m$) with the subgraph for category c are classified fourfold as follows:

(1) If the value $v_m$ already exists in category c as a value synonym of an attribute $a_i$ similar to $a_m$ (herein also termed "duplicate match"), the attribute-value pair ($a_m$, $v_m$) may be considered a duplicate and, as such, ignored.

(2) If the subgraph for category c includes, under an attribute $a_i$ similar to $a_m$, a value $v_{i_j}$ that is closely related, but not identical, to $v_m$ (herein also termed "value match"), the value $V_m$ may be added to the subgraph as a synonym of node $v_{i_j}$.

(3) If an attribute $a_i$ similar to $a_m$ exists in the subgraph for category c, but has no value $v_{i_j}$ similar to $v_m$ (herein also termed "attribute match"), $v_m$ may be added to the subgraph as a new value of node $a_i$.

(4) If the subgraph for category c does not include any attribute $a_i$ similar to $a_m$ (herein also termed "mismatch"), $a_m$ may be added to the subgraph as a new attribute node with a single value $v_m$.

Figure 2:
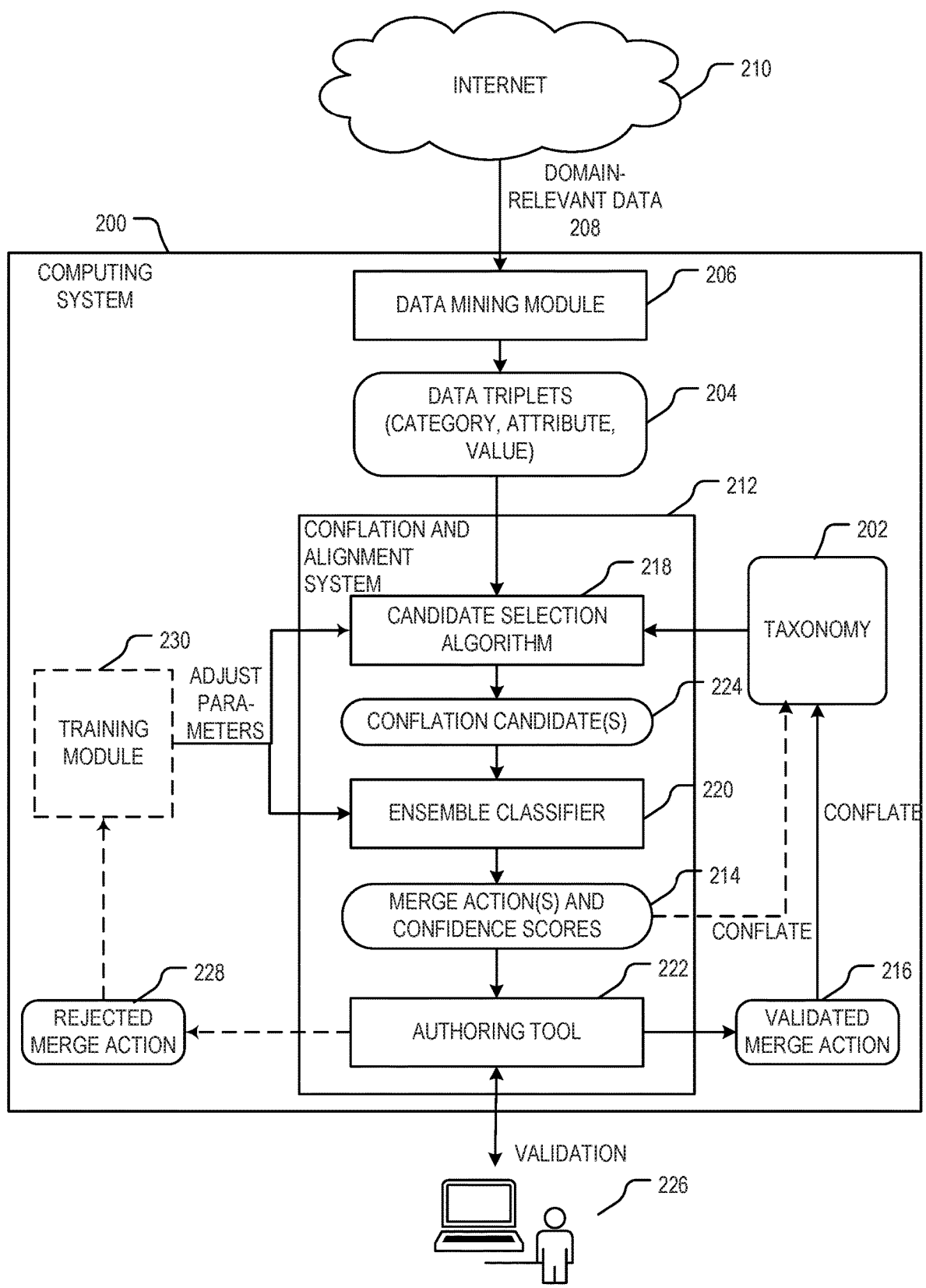
FIG. 2 is a schematic block diagram of an example system for merging new data into an existing taxonomy, in accordance with various embodiments.
Figure 6:
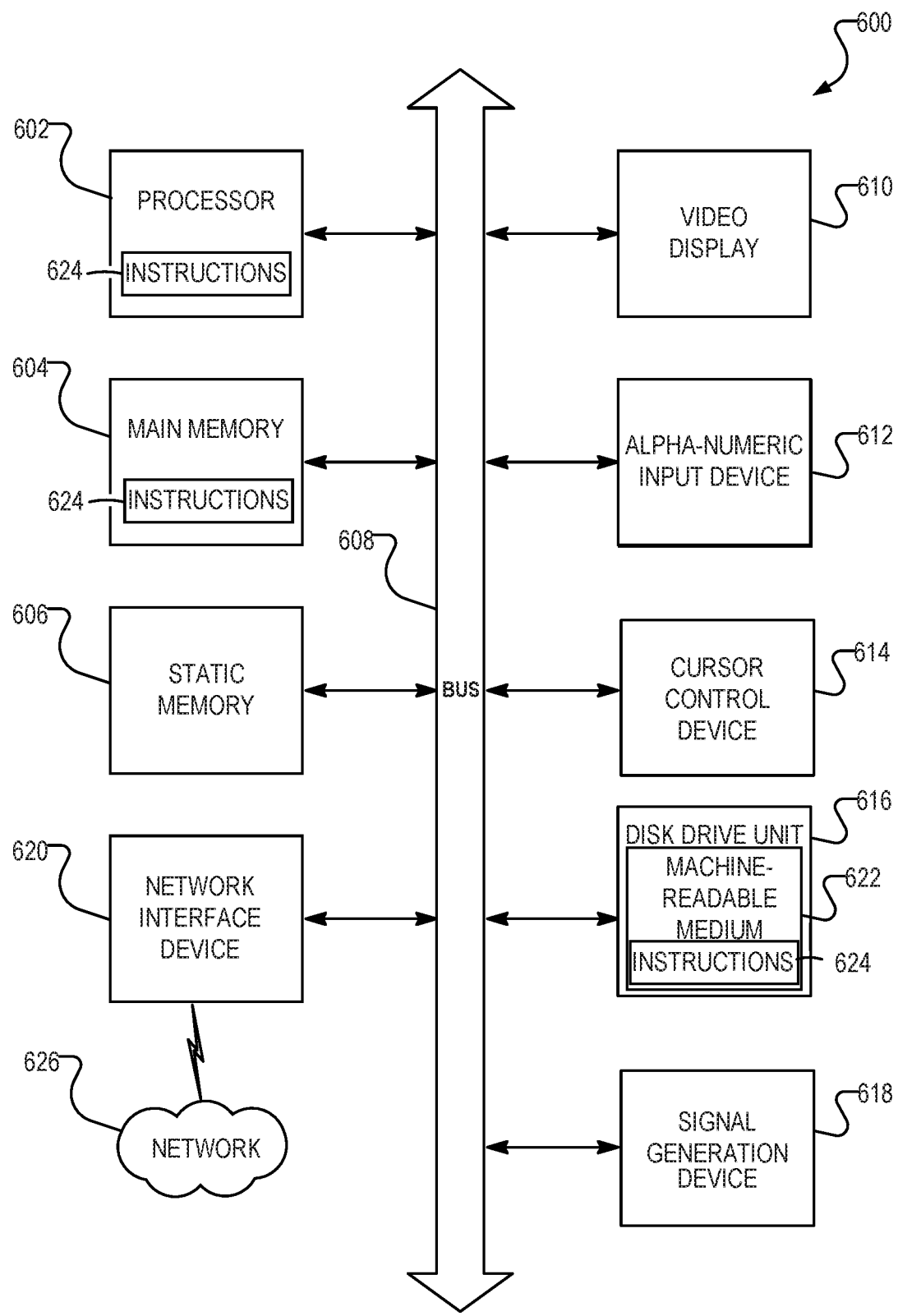
FIG. 6 is a block diagram of an example computing system as may be used to implement the system of FIGS. 2 and 3, in accordance with various embodiments.

With reference to FIG. 2, a computing system 200 for merging new data into an existing taxonomy will now be described. The computing system 200 can be implemented with a suitable combination of hardware and/or software, and generally includes one or more suitably configured or programmed hardware processors (such as central processing units (CPUs), graphic processing units (GPUs), digital signal processors (DSPs), field-programmable gate arrays (FPGAs), application-specific integrated circuits (ASICs), etc.). In various embodiments, the computing system 200 is a general-purpose computer, e.g., as illustrated in FIG. 6, or a cluster of multiple such computers intercommunicating via a network. In brief, the computer or cluster includes one or more CPUs and/or GPUs, as well as (volatile and/or non-volatile) memory storing data and program code for execution by the CPU(s) and/or GPU(s). The computer may also include input/output devices (e.g., a keyboard/mouse and screen display for user interactions) and/or a network interface (e.g., for connecting to the internet).

The computing system 200 stores data structures representing a taxonomy 202 (e.g., a plant taxonomy as illustrated in FIG. 1) and data triplets 204 (each specifying a category and an attribute-value pair) to be merged into the taxonomy 202, these data structures may, for instance, be entries in a database. The data triplets 204 may, for example, take the form of string-valued three-component vectors (C, $a_m$, $v_m$), but other representations that maintain the proper associations between category, attribute, and value (e.g., separate files for respective categories c, each file listing one or more attribute-value pairs associated with the category) are also possible. The functionality for conflating the data triplets 204 with the taxonomy 202, and related functionality, may be provided by multiple functional blocks, which, in software implementations, correspond to blocks of program code (or, put differently, groups of processor-executable instructions). In FIG. 2, the functional blocks are shown as rectangles with sharp corners, whereas data structures (whether stored permanently or merely temporarily) are depicted as rectangles with rounded corners.

In various embodiments, the computing system 200 includes a data mining module 206 that mines the data triplets 204 from externally sourced data 208 relevant to the domain of the taxonomy 202, e.g., as downloaded from the internet 210. For example, for a plant taxonomy, the domain-relevant data 208 may include data mined from seed catalogs, garden center websites, botany journals, and hobby gardener blogs. As another example, for a product taxonomy, the domain-relevant data 208 may, for instance, include product feeds from multiple manufacturers or product information obtained from e-commerce sites. Alternatively to being generated within the computing system 200 from other data, the data triplets 204 may also be received directly as such at the computing system 200.

The data triplets 204 are fed into a conflation and alignment system 212 that outputs merge actions (shown at 214, 216) selected among the four above-described options for conflating a data triplet 204 with an existing taxonomy 202. As shown, the conflation and alignment system 212 may include multiple sub-blocks 218, 220, 222 to produce the output in a sequence of steps. First, a candidate selection algorithm 218 identifies, for each input data triplet 204, one or more conflation candidates 224 among the attribute-value pairs of the subgraph for class c in the taxonomy 202. An ensemble classifier 220 then determines suitable merge actions and associated confidence scores, collectively 214, for the conflation candidates 224 and the associated data triplet 204. If multiple conflation candidates 224 are determined for a given data triplet 204, the respective merge actions can be ranked based on the confidence scores, and the merge action that has the highest confidence score can be used to conflate the data triplet 204 with the taxonomy 202.

Alternatively, as shown, the merge action(s) and confidence score(s) 214 for the one or more conflation candidates 224 for a given data triplet 204 may be passed on to the authoring tool 222, which then presents the merge action(s) for validation to a user 226, beginning with the merge action with the highest confidence score. The authoring tool 222 may, for instance, display the attribute-value pair of the data triplet and the conflation action, along with the taxonomy graph as it would result from the merge action. The user 226 can determine whether the proposed action is appropriate, and either approve or deny the conflation. If the user 226 approves, the now validated merge action 216 is executed, and the conflation and alignment system 212 proceeds to the next data triplet 204 (if any). Otherwise, if the user 226 rejects the proposed merge action, he will be presented with the merge action having the next-highest associated confidence score (if any). The rejected merge action 228 may be passed on as feedback to a training model 230, which may adjust one or more parameters of the candidate selection algorithm 218 and/or the ensemble classifier 220 to improve their performance.

Figure 3:
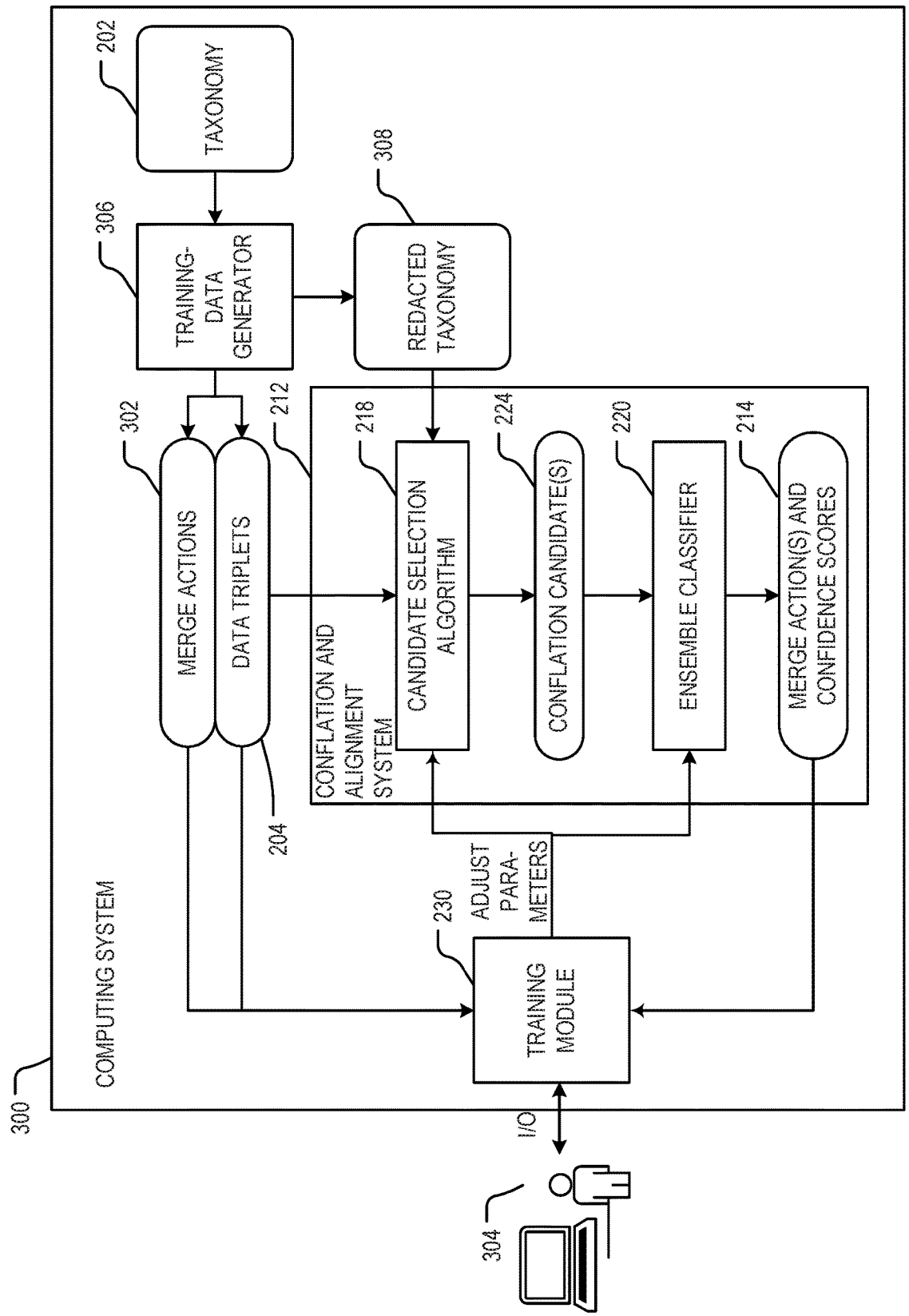
FIG. 3 is a schematic block diagram of an example system for training a conflation and alignment system for merging new data into an existing taxonomy, in accordance with various embodiments.

FIG. 3 illustrates an example computing system 300 for training the conflation and alignment system 212, using the training module 230. The computing system 300 can be implemented with a suitable combination of hardware and/or software that generally includes one or more suitably configured or programmed hardware processors, and may be, e.g., a general-purpose computer or computer cluster with CPUs/GPUs, memory, input/output devices and/or a network interface. In some embodiments, the computing systems 200, 300 for training the conflation and alignment system 212 and using it to merge new data into the taxonomy 202 are simply different subsets of components (functional blocks and data structures) all residing and executing on the same physical machine or group of machines (e.g., using the same hardware processors to execute overlapping, but distinct sets of instructions). In other embodiments, the conflation and alignment system 212, taxonomy 202, and, optionally, training module 230 are duplicated between two sets of machines or groups of machines, one used to train the conflation and alignment system 212, and the other one used to determine and perform conflation actions on new data. In this case, values of the adjustable parameters of the conflation and alignment system 212 may be communicated from the computing system 300 used in training to the computing system 200 used for actual conflation tasks.

As shown, the computing system 300 stores the taxonomy 202 for which the conflation and alignment system 212 is to be trained, as well as a set of labeled training data including data triplets 204 and associated known, "ground-truth" merge actions 302. Based on this training data, the training module 230 can iteratively tune adjustable parameters of the candidate selection algorithm 218 and/or the ensemble classifier 220 to minimize the discrepancy between the merge action(s) (of 214) selected by the conflation and alignment system 212 and the ground-truth merge actions 302, and/or to maximize the confidence scores (of 214) that the conflation and alignment system 212 assigns to the ground-truth merge actions 302. In various embodiments, as described below in more detail, the ensemble classifier 220 includes a neural-network model. To adjust the weights of the neural network model, the training module 230 may employ a conventional neural-network learning algorithm, such as, e.g., standard backpropagation of errors with gradient descent, as is well known to those of ordinary skill in the art. In some embodiments, the well-known Adam optimization algorithm, an extension to classic gradient descent methods that can improve computational performance and lower memory requirements, is utilized. The training module 230 may also take human input from a user 304. For example, threshold parameters employed by the candidate selection algorithm 218 and/or by one or more models (e.g., a heuristic model and/or a decision tree) forming part(s) of the ensemble classifier 220 may be set and adjusted manually by the user 304 based on a suitable presentation of data triplets 204 and ground-truth merge actions 302 along with the merge actions and confidence scores 214 output by the conflation and alignment system 212.

In some embodiments, as shown, the computing system 300 includes a training data generator 306 for creating training data based on the existing taxonomy 202. In general, the training data generator 306 obtains the data triplets 204 by sampling from the taxonomy 202, classifies each data triplet 204 by randomly (in accordance with some specified distribution) selecting a corresponding merge action 302 corresponding to one of the classifications (duplicate match, value match, attribute match, or mismatch), and then redacts the taxonomy 202 to reflect the assigned classifications, such that, when any one of the sampled data triplets 204 is subsequently to be merged with the redacted taxonomy 308, the appropriate action to do so is the assigned merge action 302. In this manner, it is ensured, by design of the redacted taxonomy 308, that the merge actions 302 randomly assigned to the data triplets 204 are, indeed, ground-truth labels. In some embodiments, the attributes and values of the data triplets 204 constituting the training data are lemmatized (e.g., with a probability of 0.5) to prevent them from always exactly matching the existing attributes and values in the redacted taxonomy 308.

As will be appreciated, the extraction and labeling of the data triplets 204 and redaction of the taxonomy 202 can be achieved in various ways. In some embodiments, the training data generator 306 first samples attributes from the taxonomy 202, and stores, for each sampled attribute, one or more entries each including the attribute name, a value name, a list of value synonyms, and the category to which the attribute belongs. The subgraphs within the taxonomy 202 that correspond to the selected attributes are then removed from the graph, resulting in an initial redacted taxonomy 308.

The attributes are each assigned to one of the four classes, for example, randomly based on a specified split (e.g., 20%°, 20%, 20%, and 40%, for duplicate matches, value matches, attribute matches, and mismatches, respectively). For each attribute classified as a duplicate match, the respective subgraph is added back into the redacted taxonomy 308. Further, to complete the data triplet(s) 204 for the attribute, one of the value synonyms listed in each entry is randomly selected. Alternatively, to generate only one data triplet 204 for a given attribute within a given category, the training data generator may randomly select one among potentially multiple entries for that attribute and category (discarding any others), thereby selecting one value, and further randomly select a value synonym for the value. When the trained conflation and alignment system 212 later encounters a duplicate data triplet 204, it should identify this data triplet as a duplicate of an attribute-value pair already existing in the redacted taxonomy 308 under the relevant category, and accordingly select the merge action for duplicate matches. For each attribute classified as a value match, a value synonym is selected for each respective entry (or, alternatively, for a selected one among multiple entries differing in value). The subgraph for the attribute, less the selected value synonym(s), is added back to the redacted taxonomy 308. Upon encountering a data triplet 204 that includes the attribute paired with one of the selected value synonyms, the conflation and alignment system 212 should recognize that value as a synonym of an existing value under an existing attribute node. For each attribute classified as an attribute match, one of the entries for that attribute (among possibly multiple entries different in value), and one of the value synonyms listed in that entry, is selected to complete the data triplet 204. The subgraph for the attribute, except the sub-subgraph for the selected value with all its value synonyms, is then added back into the redacted taxonomy 308. When the conflation and alignment system 212 sees the data triplet 204, it should recognize it as matching an existing attribute, and add it as a new value under that attribute. Finally, for each attribute classified as a mismatch, a corresponding value (i.e., one of the value synonyms within one of the entries) is randomly selected to serve as the value for the training data triplet 204. Nothing is added back into the redacted taxonomy 308 in this case.

Of course, instead of removing subgraphs for all selected attributes from the existing taxonomy 202 and selectively adding the subgraphs or portions thereof back in, it is also possible to hold off on redacting the taxonomy 202 until after the sampled attributes have been classified, and then to selectively remove, if anything, value synonyms, entire values, or entire attribute subgraphs.

Having described computing systems 200, 300 for merging new data into an existing taxonomy and training the conflation and alignment (sub-)system 212 used to do so, the algorithms, operations, and metrics employed by the conflation and alignment system 212 will now be described in more detail.

Figure 4:
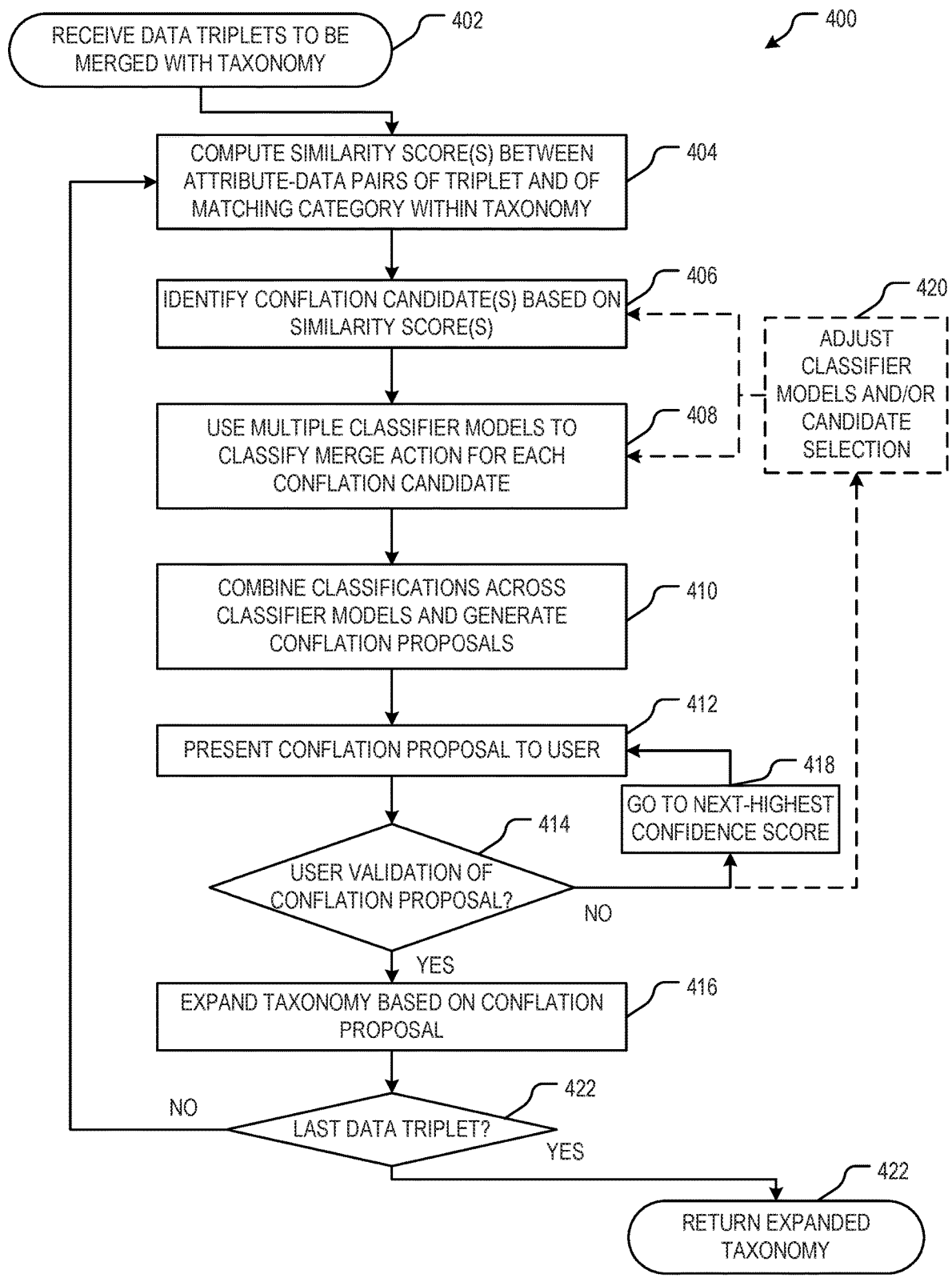
FIG. 4 is a flow chart of a method of merging new data into an existing taxonomy, in accordance with various embodiments.

FIG. 4 illustrates an example method 400 of operation of the conflation and alignment system 212. The method 400 begins, at 402, with the receipt of data triplets 204 (c, $a_m$, $v_m$) to be merged with the taxonomy 202, more specifically, with a subgraph of the taxonomy 202 that corresponds to category c. For each data triplet 204, one or more similarity scores measuring similarity between the attribute-value pair ($a_m$, $v_m$) of that data triplet 204 and the attribute-value pairs ($a_i$, $v_{i_j}$) of the subgraph of the taxonomy 202 corresponding to category c are computed in operation 404 for subsequent use by the candidate selection algorithm 218 and/or the ensemble classifier 220. The similarity scores may measure both structural and semantic similarity, and may be computed both between attributes and between values.

In various embodiments, structural similarity is measured in terms of a string similarity score $\phi_{str}(a,b)$ that quantifies a percentage match from 0.0 (0%) to 1.0 (100% match) between two strings a and b of lengths |a| and |b|, respectively, based on the Levenshtein distance. The Levenshtein distance $lev_{a,b}(|a|, |b|)$ is given by:

$$lev_{a,b}(|a|, |b|) = \begin{cases} \max(i, j) & \text{if } \min(i, j) = 0 \\ \min \begin{cases} lev_{a,b}(i-1, j) + 1 \\ lev_{a,b}(i, j-1) + 1 \\ lev_{a,b}(i-1, j-1) + 1_{a_i \neq b_j} \end{cases} & \text{otherwise} \end{cases}$$

where $1_{a_i \neq b_j}$ is the indicator function equal to $a_i = b_j$ and equal to 1 otherwise, and $lev_{a,b}(i,j)$ is the distance between the first i characters of a and the first j characters of b. The lower $lev_{a,b}(|a|, |b|)$, the more structurally similar are a and b. The percentage match can be computed as:

$$\phi_{str}(a, b) = \frac{\max(|a|, |b|) - lev_{a,b}(|a|, |b|)}{\max(|a|, |b|)}.$$

$\phi_{str}(a,b)$ may be computed, for instance, using the FuzzyWuzzy Python library.

The scoring function $\phi_{str}(a,b)$ can be adapted differently for attributes and values. For attributes, an attribute string similarity score $\phi_{attr}(a_m, a_i)$ may be defined as:

$$\phi_{attr}(a_m, a_i) = \phi_{str}(a_m, a_i).$$

For values, two scores can be defined to reflect that values have synonyms that provide more information. The first score $\phi_{val}(v_m,v_{i_j})$, hereinafter also referred to as the value string similarity score, averages over the string similarities between the new value $v_m$ and every synonym $$s_{i_{j_r}}$$

of $v_{i_j}$:

$$\phi_{val}(v_m, v_{i_j}) = \frac{\sum_{r=1}^{s} \phi_{str}(v_m, s_{i_{j_r}})}{s}.$$

The second score $\phi_{max}(v_m,v_{i_j})$, hereinafter also referred to as the maximum string similarity core, is the highest string matching score between $v_m$ and the synonyms of $v_{i_j}$:

$$\phi_{max}(v_m, v_{i_j}) = \max_r \phi_{str}(v_m, s_{i_{j_r}}).$$

While string similarity is often a good measure of relatedness between two attributes or two values, in some cases, semantic similarity is a better indicator. For example, the attributes "size" and "length" differ greatly in structure, but should be conflated when they refer to the same concept, as is the case, e.g., when they refer to a clothing item such as pants. Semantic similarity between two words a and b can be computed in terms of the cosine similarity of their "embeddings" $\vec{x}_a$ and $\vec{x}_b$, which are vector representations output by a neural network. In some embodiments, skip-gram embeddings (e.g., having 300 dimensions), as can be computed with commonly known neural network models such as Word2Vec with skip-gram architecture or FastText with skip-gram architecture, are used. FastText represents each word using bag-of-character n-grams. Beneficially, this allows the model to compute representations for out-of-vocabulary words by comparing its character-level n-grams with words in the vocabulary. The model (e.g., FastText or Word2Vec) can be trained or pre-trained on a suitable text corpus, e.g., Google News or Wikipedia. The cosine similarity of the word embeddings $\vec{x}_a$ and $\vec{x}_b$ is given by:

$$\cos(\vec{x}_a, \vec{x}_b) = \frac{\vec{x}_a \cdot \vec{x}_b}{\|\vec{x}_a\| \cdot \|\vec{x}_b\|},$$

and its values range from 0.0 for unrelated concepts to 1.0 for identical concepts.

In various embodiments, a semantic attribute similarity score $\rho_{attr}(a_m,a_i)$ measures the semantic similarity between two attributes $a_m$, $a_i$ according to:

$$\rho_{attr}(a_m,a_i)=\cos(\vec{x}_{a_m}, \vec{x}_{a_i}).$$

For values, a semantic value similarity score $\rho_{val}(v_m,v_{i_j})$ is defined as the average semantic similarity of the new value $v_m$ with every synonym $$s_{i_{j_r}}$$

of the existing value $v_{i_j}$:

$$\rho_{val}(v_m, v_{i_j}) = \frac{\sum_{r=1}^{s} \cos(\vec{x}_{v_m}, \vec{x}_{s_{i_{j_r}}})}{s}.$$

Similarity metrics such as $\phi_{attr}(a_m,a_i)$, $\phi_{val}(v_m,v_{i_j})$, $\phi_{max}(v_m,v_{i_j})$, $\rho_{attr}(a_m,a_i)$, and $\phi_{val}(v_m,v_{i_j})$, or possibly others not specifically described herein, can be used in various combinations to aid in the identification of conflation candidates 224 within the taxonomy 202 to merge with the attribute value pair $(a_m,v_m)$ of a new data triplet 204 (operation 406). This step generally involves scoring and ranking all attribute-value pairs $(a_i,v_{i_j})$ within the subgraph for category c of the taxonomy 202 based on a measure of pairwise similarity with $(a_m,v_m)$. In one (non-limiting) embodiment, the pairwise similarity measure used for this purpose is a linear combination of the attribute string similarity score and the semantic value similarity score (with weights computed statistically to maximize the accuracy of the candidate selection algorithm 218):

$$\phi_{pair}=0.4\cdot\phi_{attr}(a_m,a_i)+0.6\rho_{val}(v_m,v_{i_j})$$

The scored attribute-value pairs $(a_i,v_{i_j})$ are ranked by $\phi_{pair}$ in non-increasing order, and the K top-ranking attribute-value pairs (K≥1) are returned as the conflation candidates 224. Identifying conflation candidates is this manner serves to quickly narrow down the search space for the subsequent application of the ensemble classifier 220, as running classification models on all attribute-value pairs $(a_i,v_{i_j})$ within category c may be too costly to be feasible in practice.

The conflation candidates 224 are provided to multiple classifier models, collectively the ensemble classifier 220. In operation 408, each classifier model determines—independently from the other models—an appropriate merge action to be taken for each conflation candidate 224 by classifying each candidate 224 as one of a duplicate match, a value match, an attribute match, or a mismatch of the attribute-value pair $(a_m,v_m)$ of the new data triplet 204. Using multiple models can improve the overall accuracy of the determination. While generally any number and types of classifier models can be used, various embodiments employ three models: a naïve heuristic model, a decision tree model, and a neural network model.

The naïve heuristic model uses hard-coded binary decision-making steps to assign each conflation candidate to one of the four classes. In one embodiment, the decision-making steps operate on the attribute string similarity score $\phi_{attr}(a_m, a_i)$, the maximum string similarity score $\phi_{max}(v_m,v_{i_j})$, and the semantic value similarity score $\rho_{val}(v_m,v_{i_j})$. If $\phi_{max}(v_m,v_{i_j})\geq 0.95$, the conflation candidate is classified as a duplicate match. (In a variation, a second condition may be imposed to ensure separately that the attributes of the data triplet 204 and the conflation candidate also match.) Otherwise, if $\rho_{val}(v_m,v_{i_j})\geq 0.60$, the conflation candidate is classified as a value match. If $\rho_{val}(v_m,v_{i_j})<0.60$, but $\phi_{attr}(a_m,a_i) \geq 0.75$, the conflation candidate is classified as an attribute match. If none of the conditions holds, the conflation candidate is deemed a mismatch. The indicated threshold values (i.e., 0.95, 0.6, and 0.75 for the various similarity scores) are merely non-limiting examples, and other values may be used. Suitable threshold values may be determined by hand using trial and error, or may be learned statistically. Beneficially, the naïve heuristic model provides a fast, computationally relatively inexpensive means for determining merge actions for data triplets 204.

The decision tree model builds upon the naïve heuristic model to provide a more automated approach to classification using manually engineered features, and to avoid issues associated with hard-coding thresholds for manual classification. In various embodiments, the decision tree discriminates between duplicate matches, value matches, and attribute matches. To identify mismatches, a simple attribute-based heuristic is used to decide whether or not a new attribute is to be created in the taxonomy 202. Specifically, in one embodiment, if $\phi_{attr}(a_m,a_i)<0.6$ and $\phi_{attr}(a_m,a_i)<0.6$, the conflation candidate 224 is deemed a mismatch, calling for $a_m$ to be added as a new attribute. Other threshold values may be used. For a given taxonomy 202 and set of training data, suitable threshold values may be determined by a parameter search and selection of the threshold values resulting in the best performance. In general, for the identification of mismatches, a simple threshold-based heuristic has been found to be highly accurate.

If the attribute-based heuristic evaluates to false, the decision tree is run on a number of features to select a merge action among those for duplicate matches, value matches, and attribute matches. The decision tree can operate on generic features such as string lengths, word counts, etc., but the use of similarity scores as described above has been found to be beneficial. In particular, in one embodiment, a decision tree of maximum depth D=3 is trained on $\phi_{val}(v_m,v_{i_j})$, $\phi_{max}(v_m,v_{i_j})$ and $\rho_{val}(v_m,v_{i_j})$. Further metrics such as $\rho_{attr}(a_m,a_i)$, $\phi_{attr}(a_m,a_i)$, a partial string match ratio, the number of common words, and so on may be utilized as additional features.

The neural network model provides a completely automated approach to classifying the merge actions for conflation candidates 224. Trained end-to-end, it avoids both manual feature engineering and naïve classification. Various embodiments use recurrent neural network (RNN) models, such as a Long Short-Term Memory (LSTM) models, which have been proven successful with text-based classification tasks. More specifically, in one embodiment, a symmetric Siamese architecture that takes sentence embeddings of the attribute-value pairs of the conflation candidate 224 and the data triplet 204 as input features at an LSTM layer is employed to learn similarity between the two inputs.

Figure 5:
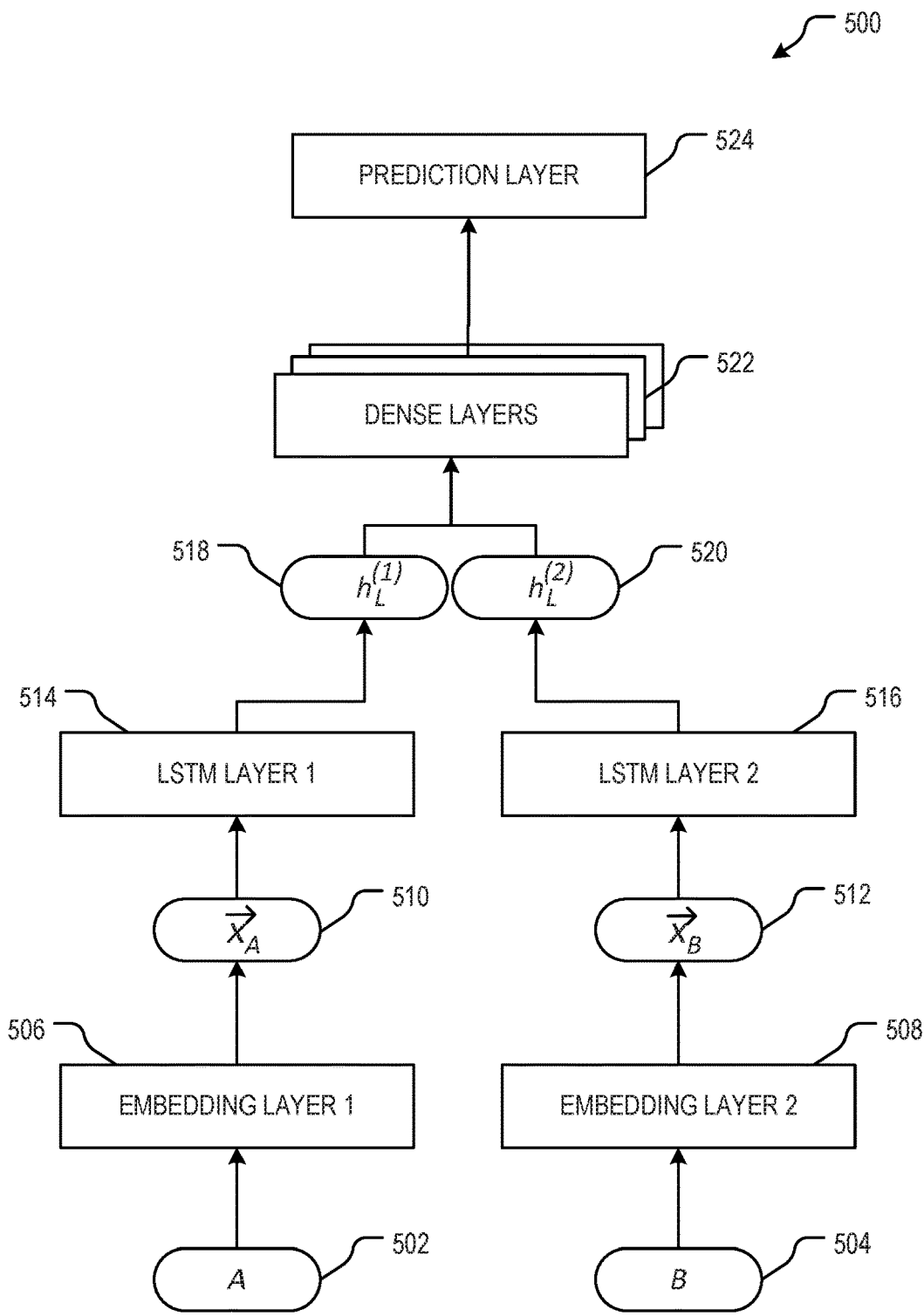
FIG. 5 is a block diagram of an example neural network architecture used in an ensemble classifier of the systems of FIGS. 2 and 3, in accordance with various embodiments.

With reference to FIG. 5, the layer structure of an example Siamese LSTM model 500 is illustrated. Given a new attribute-value pair $(a_m,v_m)$ and a conflation candidate $(a_i, v_{i_j})$, two respective input strings 502, 504 can be created by appending the value string to the attribute string for each pair. For example, let $a_m$ be "laptop screen size" and $v_m$ be "13 inches." Similarly, let $a_i$ be "display size" and $v_{i_j}$ be "13 in." The first input string 502, A, would then be "laptop screen size 13 inches," and the second input string 504, B, would be "display size 13 in." As shown, the two input strings 502, 504 are fed into respective embedding layers 506, 508 to generate sentence embeddings $\vec{x}_A$ and $\vec{x}_B$ (510, 512). The embedding layers 506, 508 may have dimensionality L·k, creating word-level embeddings of size k=300 for the first L characters in $\vec{x}_A$ and $\vec{x}_B$ (510, 512), L thus being the maximum processed string length. Strings with fewer than L characters may be padded with zeros. The embedding layers 506, 508 may be implemented with any known word-embedding model, such as the FastText model. For words whose embeddings do not exist in the FastText model, the respective embeddings may be initialized to the zero vector. The word embeddings may generally be fixed or trainable.

The sentence embeddings $\vec{x}_A$ and $\vec{x}_B$ (510, 512) output by the embedding layers 506, 508 are provided as input to respective (single) LSTM layers 514, 516, which generate hidden output vectors $h_L^{(1)}$ and $h_L^{(2)}$ (518, 520) of size H. The output vectors $h_L^{(1)}$ and $h_L^{(2)}$ (518, 520) are concatenated and fed into a series of (e.g., three) dense layers 522 with ReLU activation (as known to those of ordinary skill in the art), for example. The output of the dense layers 522 is passed on to a predication layer 524 with softmax activation to obtain the final classification, that is, a probability distribution over the four classes (duplicate matches, value matches, attribute matches, and mismatches). The model 500 may be trained with the Adam optimizer, using a categorical cross-entropy loss function for multi-class classification, as known to those of ordinary skill in the art.

With renewed reference to FIG. 4, once the individual classifier models have separately classified the merge action for each conflation candidate 224 in operation 408, their respective classifications are combined, in operation 410, to generate an overall conflation proposal for each conflation candidate 224. In some embodiments, the overall classification for a given conflation candidate 224 is obtained from the classifications of the individual classifier models by majority voting, e.g., given equal weight to each model. With three models (e.g., the naïve heuristic model, decision tree model, and neural network model described above), there will be no tie between two classes. However, in some instances, the three models may result in three different classifications. A rule supplementing the majority voting rule may in this case select one classification. For example, in one embodiment, the classification decision made by the neural network model is chosen in cases where there is no agreement between at least two of the models. As will be appreciated, the ensemble classifier 220 may have more than three classifier models, or only two classifier models, and the voting rules and supplemental rules governing special cases (e.g., with only two models, the case of a tie) may be defined to always reach an overall, final classification decision. Further, instead of hard uniform voting, other voting systems may be used to implement, e.g., weighting or soft voting. In an example soft voting method, the predicted probabilities associated with each classification are summed across classifier models, and the argmax function of the sum is selected as the overall classification. In principle, it is also possible to use only one classifier model at the outset. However, using multiple models in conjunction has been found to generally boost the accuracy of the classification.

The conflation proposal, which may include, for each conflation candidate, a classification specifying the respective merge action and an associated confidence score derived from the probabilities associated with the classification (e.g., using an entropy calculation as known to those of ordinary skill in the art) (collectively 214), may be presented to a user 226 for validation (operation 412), e.g., by the authoring tool 222. The user 226 may, for instance, be shown a portion of the taxonomy graph 202 as expanded by the new data triplet 204, the added node being visually marked in some way (e.g., with a different color). Alternatively, the merge action (of 214) and data triplet 204 may be presented textually alongside a representation of the taxonomy 202. If the user 226 validates the conflation proposal (at 414), the taxonomy 202 is expanded based thereon in operation 416, i.e., the attribute-value pair of the data triplet 204 is merged with the conflation candidate in accordance with the merge action. Otherwise, if the user 226 rejects the proposal (at 414), and if there are further conflation candidates 224 for the data triplet 204, the authoring tool 222 moves on, at 418, to the next conflation proposal, such as the conflation candidate and associated merge action with the next-highest confidence score, and presents this proposal to the user 226 (operation 412). The process continues in a loop, generally in order of non-increasing confidence score, until either the user 226 has validated a conflation proposal or the list of conflation candidates 224 has been exhausted. Whenever the user 226 rejects a conflation proposal at 414, the rejection may be used as feedback to adjust the classifier models and/or parameters of the candidate selection algorithm (operation 420). Once a data triplet 204 has been conflated with the taxonomy 202 (or all conflation proposals have been rejected), the method 400 proceeds to processing the next data triplet 204 received in operation 402. Upon merging all data triplets 204 into the taxonomy 202, the conflation and alignment system 212 returns the expanded taxonomy (operation 422).

The system and methods described herein generally provide an effective way for conflating taxonomy data, e.g., by merging individual data items (triplets) into an existing taxonomy graph. Beneficially, various embodiments of the automatic conflation and alignment system described herein can handle a taxonomy graph with a complex structure (e.g., including, in different categories, different sets of attributes, values, synonyms, and/or sub-categories), and is able to generalize across different categories and attribute-value meanings by properly dealing with synonyms and homographs. By using semantic similarity metrics in addition to structural similarity metrics, for example, synonyms can be recognized as such, avoiding the insertion of nodes with duplicative content into the taxonomy graph. Similarly, by using multiple attribute-based and value-based similarity metrics in conjunction to identify conflation candidates, a suitable place for inserting new data can be determined more accurately and more efficiently.

Ultimately, taxonomy conflation in accordance herewith can help build a richer, more comprehensive taxonomy. When used in the context of a search or recommendation system, a richer taxonomy may, in turn, enhance search queries and diversify or otherwise improve results. The increased attribute knowledge provided by a richer taxonomy may, for instance, be used to present a user with options to narrow down his search, to automatically identify value synonyms to capture a greater number of relevant results, or to expand search results and recommendations with similar items. In applications involving product taxonomies, for instance, this can achieve a more satisfying search or browsing experience for the user.

In general, the operations, algorithms, and methods described herein may be implemented in any suitable combination of software, hardware, and/or firmware, and the provided functionality may be grouped into a number of components, modules, or mechanisms. Modules and components can constitute either software components (e.g., code embodied on a non-transitory machine-readable medium) or hardware-implemented components. A hardware-implemented component is a tangible unit capable of performing certain operations and can be configured or arranged in a certain manner. In example embodiments, one or more computer systems (e.g., a standalone, client, or server computer system) or one or more processors can be configured by software (e.g., an application or application portion) as a hardware-implemented component that operates to perform certain operations as described herein.

In various embodiments, a hardware-implemented component can be implemented mechanically or electronically. For example, a hardware-implemented component can comprise dedicated circuitry or logic that is permanently configured (e.g., as a special-purpose processor, such as a field programmable gate array (FPGA) or an application-specific integrated circuit (ASIC)) to perform certain operations. A hardware-implemented component can also comprise programmable logic or circuitry (e.g., as encompassed within a general-purpose processor or other programmable processor) that is temporarily configured by software to perform certain operations. It will be appreciated that the decision to implement a hardware-implemented component mechanically, in dedicated and permanently configured circuitry, or in temporarily configured circuitry (e.g., configured by software) can be driven by cost and time considerations.

Accordingly, the term "hardware-implemented component" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented components are temporarily configured (e.g., programmed), each of the hardware-implemented components need not be configured or instantiated at any one instance in time. For example, where the hardware-implemented components comprise a general-purpose processor configured using software, the general-purpose processor can be configured as respective different hardware-implemented components at different times. Software can accordingly configure a processor, for example, to constitute a particular hardware-implemented component at one instance of time and to constitute a different hardware-implemented component at a different instance of time.

Hardware-implemented components can provide information to, and receive information from, other hardware-implemented components. Accordingly, the described hardware-implemented components can be regarded as being communicatively coupled. Where multiple such hardware-implemented components exist contemporaneously, communications can be achieved through signal transmission (e.g., over appropriate circuits and buses that connect the hardware-implemented components). In embodiments in which multiple hardware-implemented components are configured or instantiated at different times, communications between such hardware-implemented components can be achieved, for example, through the storage and retrieval of information in memory structures to which the multiple hardware-implemented components have access. For example, one hardware-implemented component can perform an operation and store the output of that operation in a memory device to which it is communicatively coupled. A further hardware-implemented component can then, at a later time, access the memory device to retrieve and process the stored output. Hardware-implemented components can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions. The components referred to herein can, in some example embodiments, comprise processor-implemented components.

Similarly, the methods described herein can be at least partially processor-implemented. For example, at least some of the operations of a method can be performed by one of processors or processor-implemented components. The performance of certain of the operations can be distributed among the one or more processors, not only residing within a single machine, but deployed across a number of machines. In some example embodiments, the processor or processors can be located in a single location (e.g., within an office environment, or a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs)).

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a component, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

FIG. 6 is a block diagram of a machine in the example form of a computer system 600 within which instructions 624 may be executed to cause the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus 608. The computer system 600 can further include a video display 610 (e.g., a liquid crystal display (LCD) or a cathode ray tube (CRT)). The computer system 600 also includes an alpha-numeric input device 612 (e.g., a keyboard or a touch-sensitive display screen), a user interface (UI) navigation (or cursor control) device 614 (e.g., a mouse), a disk drive unit 616, a signal generation device 618 (e.g., a speaker), and a network interface device 620.

The disk drive unit 616 includes a machine-readable medium 622 on which are stored one or more sets of data structures and instructions 624 (e.g., software) embodying or utilized by any one or more of the methodologies or functions described herein. The instructions 624 can also reside, completely or at least partially, within the main memory 604 and/or within the processor 602 during execution thereof by the computer system 600, with the main memory 604 and the processor 602 also constituting machine-readable media.

While the machine-readable medium 622 is shown in an example embodiment to be a single medium, the term "machine-readable medium" can include a single medium or multiple media (e.g., a centralized or distributed database, and/or associated caches and servers) that store the one or more instructions 624 or data structures. The term "machine-readable medium" shall also be taken to include any tangible medium that is capable of storing, encoding, or carrying instructions 624 for execution by the machine and that cause the machine to perform any one or more of the methodologies of the present disclosure, or that is capable of storing, encoding, or carrying data structures utilized by or associated with such instructions 624. The term "machine-readable medium" shall accordingly be taken to include, but not be limited to, solid-state memories, and optical and magnetic media. Specific examples of machine-readable media 622 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 624 can be transmitted or received over a communication network 626 using a transmission medium. The instructions 624 can be transmitted using the network interface device 620 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi and WiMax networks). The term "transmission medium" shall be taken to include any intangible medium that is capable of storing, encoding, or carrying instructions 624 for execution by the machine, and includes digital or analog communications signals or other intangible media to facilitate communication of such software.

The following numbered examples are provided as illustrative embodiments.

Example 1

A method comprising: using one or more computer processors to perform operations for extending a multi-level taxonomy that comprises at least categories, attributes, and values based on data triplets each comprising an attribute-value pair and an associated category, the operations comprising, for each of the data triplets: identifying, among attribute-value pairs within a category of the taxonomy that matches the category of the data triplet, based on a measure of similarity of the attribute-value pairs to the attribute-value pair of the data triplet, one or more conflation candidates; using an ensemble classifier operating on a plurality of features associated with the conflation-candidates and the attribute-value pair of the data triplet, assigning each of the one or more conflation-candidates to one of a plurality of classes, the classes including at least duplicate matches, attribute matches, and mismatches of the attribute-value pair of the data triplet, and extending the taxonomy with the data triplets based on the classification.

Example 2

The method of example 1, wherein the measure of similarity and the plurality of features operated on by the ensemble classifier each comprise a combination of one or more semantic features and one or more syntactic features.

Example 3

The method of example 1 or example 2, wherein the taxonomy further comprises value synonyms.

Example 4

The method of example 3, wherein the measure of similarity comprises a weighted average of at least some of a semantic attribute similarity score, a semantic value similarity score aggregated over one or more value synonyms, an attribute string similarity score, a value string similarity score aggregated over the one or more value synonyms, and a maximum string similarity score identified among string similarity scores computed for the one or more value synonyms.

Example 5

The method of example 3 or example 4, wherein the classes further comprise value matches of the attribute-value pair of the data triplet.

Example 6

The method of any one of examples 1-5, wherein the ensemble classifier comprises a plurality of classifier models each classifying the conflation candidates independently from the other classifier models, the ensemble classifier combining the independent classifications based on majority voting.

Example 7

The method of any one of examples 1-6, wherein the ensemble classifier comprises at least two of a heuristic model, a decision tree model, and a neural network model.

Example 8

The method of example 7, wherein the neural network model comprises a Siamese long short-term memory network model.

Example 9

The method of example 8, wherein the Siamese long short-term memory network model takes sentence embeddings of the attribute-value pairs of the conflation candidate and the data triplet as input features at a long-short term memory representation layer.

Example 10

The method of any one of examples 1-9, wherein, for at least one of the data triplets, multiple conflation candidates are identified and classified, wherein the classification of each conflation candidate has an associated confidence score, and wherein the taxonomy is extended at a location of a selected conflation candidate that has a highest associated confidence score among the multiple conflation candidates.

Example 11

The method of any one of examples 1-10, wherein, for at least one of the data triplets, multiple conflation candidates are identified and classified, and wherein, for each of the at least one of the data triplets, the classification of each respective conflation candidate has an associated confidence score and the method further comprises, prior to extending the taxonomy with the respective data triplet, presenting a conflation candidate and classification having a highest associated confidence score to a user for validation, and either extending the taxonomy, in response to validation, with the data triplet in accordance with the classification or presenting, in response to rejection, a second conflation candidate and classification having a second-highest associated confidence score to the user for validation.

Example 12

The method of example 11, wherein the method further comprises using rejections of conflation candidates for the data triplets as training data for refining the ensemble classifier.

Example 13

The method of any one of examples 1-12, further comprising using the one or more computer processors to:

generate training data for training the ensemble classifier from an existing taxonomy by sampling training data triplets from the existing taxonomy, assigning classifications to the training data triplets, and redacting the existing taxonomy based on the sampled training data triplets and their assigned classifications; and train the ensemble classifier based on the sampled training data triplets and their assigned classifications in conjunction with the redacted taxonomy.

Example 14

The method of any one of examples 1-14, wherein the taxonomy is a product attribute taxonomy and wherein the data triplets are extracted from product information mined from e-commerce websites or product feeds.

Example 15

A system comprising: one or more hardware processors; and memory storing a data structure representing a multi-level taxonomy comprising nodes representing categories, attributes, values, and value synonyms, and further storing instructions which, when executed by the one or more hardware processors, cause the one or more hardware processors to perform operations for expanding the taxonomy with data triplets each comprising an attribute-value pair and an associated category. The operations comprise: identifying, among attribute-value pairs within a category of the taxonomy that matches the category of the data triplet, based on a measure of similarity of the attribute-value pairs to the attribute-value pair of the data triplet, a conflation candidate; using one or more classifier models to classify the conflation-candidate as one of a duplicate match, a value match, an attribute match, or a mismatch of the attribute-value pair of the data triplet; and extending the taxonomy by adding a value of the attribute-value pair of the data triplet as a new value synonym to the conflation candidate following classification of the conflation candidate as a value match, adding the value of the attribute-value pair of the data triplet as a new value to the conflation candidate following classification of the conflation candidate as an attribute match, and adding the attribute-value pair of the data triplet as a new attribute-value pair to the associated category following classification of the conflation candidate as a mismatch.

Example 16

The system of example 15, wherein the operations further comprise, prior to extending the taxonomy, presenting the conflation candidate and classification to a user and receiving validation from the user.

Example 17

The system of example 15 or example 16, wherein the memory further stores instructions which, when executed by the one or more hardware processors, cause the one or more hardware processors to perform operations for generating training data for training the one or more classifier models, the operations comprising: sampling training data triplets from the taxonomy, randomly assigning merge actions selected from merge actions for duplicate matches, value matches, attribute matches, and mismatches to the sampled data triplet, and redacting the taxonomy to reflect the merge actions assigned to the sampled training data triplets.

Example 18

The system of any one of examples 15-17, wherein the memory further stores instructions which, when executed by the one or more hardware processors, cause the one or more hardware processors to mine the data triplets from domain-relevant data obtained from a data source external to the system.

Example 19

One or more machine-readable media storing instructions for execution by one or more hardware processors, execution of the instructions causing the one or more hardware processors to perform operations for merging a first attribute-value pair with a second attribute-value pair identified as a conflation candidate within a taxonomy, the operations comprising: using a plurality of classifier models to each classify the second attribute-value pair as one of a duplicate match, a value match, an attribute match, or a mismatch of the first attribute-value pair; combining classifications made by the plurality of classifier models into an overall classification by majority voting; and extending the taxonomy with the first attribute-value pair in accordance with the overall classification.

Example 20

The one or more machine-readable media of claim 19, wherein the plurality of classifier models includes a naïve heuristic model, a decision tree model, and a neural network model.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A method comprising:
using one or more computer processors to perform operations for extending a multi-level taxonomy, the multi-level taxonomy comprising at least categories, attributes, and values based on data triplets, wherein data triplets comprise an attribute-value pair and an associated category, the operations comprising, for each of the data triplets:
identifying, among attribute-value pairs within a category of the multi-level taxonomy that matches the associated category of a data triplet, based on a measure of similarity of the attribute-value pairs to the attribute-value pair of the data triplet, one or more conflation candidates in the multi-level taxonomy for extending the multiple-level taxonomy based on the data triplet;
assigning, using an ensemble classifier operating on a plurality of features associated with the one or more conflation-candidates of the multi-level taxonomy and the attribute-value pair of the data triplet, each of the one or more conflation-candidates to one of a plurality of merge actions for extending the multi-level taxonomy based on the data triplet, the plurality of merge actions including at least:

duplicate matches causing to ignore the data triplet, value matches causing an addition of a value of the attribute-value pair as a synonym, attribute matches causing an addition of the value of the attribute-value pair to a subgraph, and mismatches between the one or more conflation-candidates and the attribute-value pair of the data triplet causing an addition of the attribute-value pair; and extending the multi-level taxonomy with the data triplet based on one of the one or more conflation-candidates using the assigned one of the plurality of merge actions.

2. The method of claim 1, wherein the measure of similarity and the plurality of features operated on by the ensemble classifier each comprise a combination of one or more semantic features and one or more syntactic features.

3. The method of claim 1, wherein the multi-level taxonomy further comprises value synonyms.

4. The method of claim 3, wherein the measure of similarity comprises a weighted average of at least some of a semantic attribute similarity score, a semantic value similarity score aggregated over one or more value synonyms, an attribute string similarity score, a value string similarity score aggregated over the one or more value synonyms, and a maximum string similarity score identified among string similarity scores computed for the one or more value synonyms.

5. The method of claim 3, wherein the plurality of merge actions are based on value matches of the attribute-value pair of the data triplet.

6. The method of claim 1, wherein the ensemble classifier comprises a plurality of classifier models each classifying the conflation candidates independently from the other classifier models, the ensemble classifier combining the independent classifications based on majority voting, and the combination of the independent classifications defining at least one of the plurality of merge actions.

7. The method of claim 1, wherein the ensemble classifier comprises at least two of a heuristic model, a decision tree model, and a neural network model.

8. The method of claim 7, wherein the neural network model comprises a Siamese long short-term memory network model.

9. The method of claim 8, wherein the Siamese long short-term memory network model takes sentence embeddings of the attribute-value pairs of the conflation candidate and the data triplet as input features at a long-short term memory representation layer.

10. The method of claim 1, wherein, for at least one of the data triplets, multiple conflation candidates are identified and classified, wherein the assigned one of the plurality of merge action of each conflation candidate has an associated confidence score, and wherein the multi-level taxonomy is extended at a location of a selected conflation candidate that has a highest associated confidence score among the multiple conflation candidates.

11. The method of claim 1, wherein, for at least one of the data triplets, multiple conflation candidates are identified and classified, and wherein, for each of the at least one of the data triplets, the assigned one of the plurality of merge action of each respective conflation candidate has an associated confidence score and the method further comprises, prior to extending the multi-level taxonomy with the respective data triplet, presenting a conflation candidate and the assigned one of the plurality of merge action having a highest associated confidence score to a user for validation, and either extending the multi-level taxonomy, in response to validation, with the data triplet in accordance with the assigned one of the plurality of merge action or presenting, in response to rejection, a second conflation candidate and one of the plurality of merge action having a second-highest associated confidence score to the user for validation.

12. The method of claim 11, wherein the method further comprises using rejections of conflation candidates for the data triplets as training data for refining the ensemble classifier.

13. The method of claim 1, further comprising using the one or more computer processors to:

generate training data for training the ensemble classifier from an existing multi-level taxonomy by sampling training data triplets from the existing multi-level taxonomy, assigning one of the plurality of merge action to the training data triplets, and redacting the existing multi-level taxonomy based on the sampled training data triplets and their assigned one of the plurality of merge action; and train the ensemble classifier based on the sampled training data triplets and their assigned one of the plurality of merge action in conjunction with the redacted multi-level taxonomy.

14. The method of claim 1, wherein the multi-level taxonomy is a product attribute taxonomy and wherein the data triplets are extracted from product information mined from e-commerce websites or product feeds.

15. A system comprising:

one or more hardware processors; and memory storing:

a data structure representing a multi-level taxonomy comprising nodes representing categories, attributes, values, and value synonyms, and instructions which, when executed by the one or more hardware processors, cause the one or more hardware processors to perform operations for expanding the multi-level taxonomy with data triplets, wherein data triplets comprise an attribute-value pair and an associated category, the operations comprising:

identifying, among attribute-value pairs within a category of the multi-level taxonomy that matches the associated category of the data triplet, based on a measure of similarity of the attribute-value pairs to the attribute-value pair of the data triplet, a conflation candidate in the multi-level taxonomy for extending the multiple-level taxonomy based on the data triplet;

classifying, using one or more classifier models, the conflation-candidate as one of:

a duplicate match causing to ignore the data triplet, a value match causing an addition of a value to the attribute-value pair as a synonym, an attribute match causing an addition of the value of the attribute-value pair to a subgraph, or a mismatch of the attribute-value pair of the data triplet causing an addition of the attribute-value pair; and extending the multi-level taxonomy based at least on one of a plurality of merge actions corresponding to the classified conflation-candidate, the plurality of merge actions comprise:
adding a value of the attribute-value pair of the data triplet as a new value synonym to the conflation candidate following classification of the conflation candidate as a value match,
adding the value of the attribute-value pair of the data triplet as a new value to the conflation candidate following classification of the conflation candidate as an attribute match, and
adding the attribute-value pair of the data triplet as a new attribute-value pair to the associated category following classification of the conflation candidate as a mismatch.

16. The system of claim 15, wherein the operations further comprise, prior to extending the multi-level taxonomy, presenting the conflation candidate and classification to a user and receiving validation from the user.

17. The system of claim 15, wherein the memory further stores instructions which, when executed by the one or more hardware processors, cause the one or more hardware processors to perform operations for generating training data for training the one or more classifier models, the operations comprising:
sampling training data triplets from the multi-level taxonomy,
randomly assigning merge actions selected from merge actions for duplicate matches, value matches, attribute matches, and mismatches to the sampled data triplet, and
redacting the multi-level taxonomy to reflect the merge actions assigned to the sampled training data triplets.

18. The system of claim 15, wherein the memory further stores instructions which, when executed by the one or more hardware processors, cause the one or more hardware processors to mine the data triplets from domain-relevant data obtained from a data source external to the system.

19. One or more non-transitory machine-readable media storing instructions for execution by one or more hardware processors, execution of the instructions causing the one or more hardware processors to perform operations for merging a first attribute-value pair with a second attribute-value pair identified as a conflation candidate within a multi-level taxonomy for extending the multiple-level taxonomy based on a data triplet, wherein the data triplet comprises an attribute-value pair and an associated category, and wherein a category of the conflation candidate in the multi-level taxonomy matches with the associated category of the data triplet, the operations comprising:
using a plurality of classifier models to each classify the second attribute-value pair as one of:
a duplicate match causing to ignore the data triplet,
a value match causing an addition of a value of the attribute-value pair as a synonym,
an attribute match causing an addition of a value of the attribute-value pair to a subgraph, or
a mismatch of the first attribute-value pair causing an addition of the attribute-value pair;
combining classifications made by the plurality of classifier models into an overall classification by majority voting, wherein the overall classification determines one of a plurality of merge actions for merging the first attribute-value pair with the second attribute-value pair in the multi-level taxonomy; and
extending the multi-level taxonomy with the first attribute-value pair in accordance with the one of the plurality of merge actions based on the overall classification.

20. The one or more non-transitory machine-readable media of claim 19, wherein the plurality of classifier models includes a nave heuristic model, a decision tree model, and a neural network model.

* * * * *